US005578816A

United States Patent [19]

Fukatsu

[11] Patent Number: 5,578,816

[45] Date of Patent: Nov. 26, 1996

[54] DISPLAY PUSH SWITCH FOR USE WITH DISPLAY DEVICE HAVING AN IMAGE TRANSMISSION MEMBER FIXEDLY DISPOSED WITHIN A SWITCH HOUSING

[75] Inventor: Hirokazu Fukatsu, Nagoya, Japan

[73] Assignee: Tietech Corporation, Nagoya, Japan

[21] Appl. No.: 377,714

[22] Filed: Jan. 24, 1995

[30] Foreign Application Priority Data

Jan. 25, 1994 [JP] Japan .................................... 6-036278

[51] Int. Cl.$^{6}$ ........................................................ G01V 9/04

[52] U.S. Cl. ............................................ 250/221; 200/314

[58] Field of Search .................................... 250/229, 221, 250/239; 200/310–314, DIG. 47; 40/547, 541; 341/31, 23; 359/435

[56] References Cited

U.S. PATENT DOCUMENTS 4,551,717 11/1985 Dreher .................................... 200/314
4,855,740 8/1989 Muramatsu et al. ....................... 341/23
4,897,651 1/1990 DeMonte .................................. 341/23
5,362,961 11/1994 Hamanaka .............................. 359/435

FOREIGN PATENT DOCUMENTS 2434739 1/1976 Germany .
8436320 5/1986 Germany .
959077 5/1964 United Kingdom .

*Primary Examiner*—Que T. Le
*Attorney, Agent, or Firm*—Palmatier, Sjoquist & Helget, P.A.

[57] ABSTRACT

A display push switch has a switch housing having an open upper end and an open lower end. A key top member made of substantially transparent material is disposed within the open upper end of the switch housing. The key top member is operable by an operator to be pushed into the switch housing. An image transmission member is disposed within the switch housing. A lower end surface of the image transmission member confronts a surface structure of a display device through the open lower end of the switch housing. An upper end surface confronts the key top member and is spaced from the switch housing to permit a stroke movement of the key top member when the key top member is pushed by the operator. The image transmission member includes a plurality of image transmission elements each having a longitudinal axis in a vertical direction. The image transmission elements are arranged in juxtaposed relationship with each other.

8 Claims, 3 Drawing Sheets

DISPLAY PUSH SWITCH FOR USE WITH DISPLAY DEVICE HAVING AN IMAGE TRANSMISSION MEMBER FIXEDLY DISPOSED WITHIN A SWITCH HOUSING

BACKGROUND OF THE INVENTION

1. Field of the Invention

The present invention relates to a display push switch which is adapted to be mounted on a display device and which permits an operator to observe an image displayed on the display device through a key top member.

2. Description of the Prior Art

Various types of display switches have heretofore been proposed. One known type of the prior art display switch includes a key top member positioned about an image plane of a display device which displays an image corresponding to the key top member. Another known type of the prior art display switch includes a touch panel made of transparent material such as plastics and glass and positioned above an image plane of a display device. Still another known type of the prior art display switch includes a key top member which constitutes an image plane by itself.

The first-mentioned display switch involves the problem that an additional space for the key top member is required about the image plane, so that the display switch must be larger in size. Additionally, if the key top member plural in number, an operator cannot readily realize the relationship between the image displayed on the image plane and its corresponding key top member. Further, it is liable to cause mistaking of the key top member to be selected. With the second-mentioned display switch, the touch panel is fixed in position and therefore, click feeling or a stroke feeling cannot be obtained. With the third mentioned display switch, since one display device such as an LCD (liquid crystal display) is required for each key top member, a controller (or a driver circuit) and a backup light device is required for each display switch. This may lead to increased manufacturing costs when a plural number of the display switches each having a key top member are to be provided. The manufacturing costs may be further increased if a graphic image or a colored image is to be displayed.

SUMMARY OF THE INVENTION

It is, accordingly, an object of the present invention to provide a display push switch in which a key top member can be placed without requiring any additional space around an image plane of a display device.

It is another object of the present invention to provide a display push switch which enables an operator to readily realize the relationship between a displayed image and its corresponding key top member.

It is still another object of the present invention to provide a display push switch which provides click feeling or stroke feeling of a key top member.

It is a further object of the present invention to provide a display push switch which can be manufactured at lower cost.

According to the present invention, there is provided a display push switch adapted for mounting on a surface structure of a display device, comprising:

a switch housing having an open upper end and an open lower end;

a key top member made of substantially transparent material and disposed within the open upper end of the switch housing, the key top member being operable by an operator to be pushed into the switch housing; and an image transmission member disposed within the switch housing and having a lower end surface and an upper end surface, the lower end surface confronting the surface structure of the display device through the open lower end of the switch housing, and the upper end surface confronting the key top member and being spaced from the switch housing to permit a stroke movement of the key top member when the key top member is pushed by the operator;

the image transmission member including a plurality of image transmission elements each having a longitudinal axis in a vertical direction, the image transmission elements being arranged in juxtaposed relationship with each other.

With the present invention, through the key top member, the operator can observe the image of the display device, and the operator can easily recognize the corresponding image displayed on the display device. Further, with such recognition of the image, the operator can operate the key top member to turn on or off the switch with the clicking or stroke movement of the key top member.

The image transmission elements may be formed by lens elements each operable to form an image by itself. In such a case, by appropriately determining the length and the vertical position of the lens elements relative to the key top member, the image displayed on the display device is formed on an upper or a lower surface of the key top member as an erecting real image through the lens. The operator can therefore recognize a clear image formed on the key top member.

The invention will become more apparent from the appended claims and the description as it proceeds in connection with the drawings.

DETAILED DESCRIPTION OF THE PREFERRED EMBODIMENTS

A first embodiment of the present invention will now be explained with reference to FIGS. 1 and 2.

Figure 1:
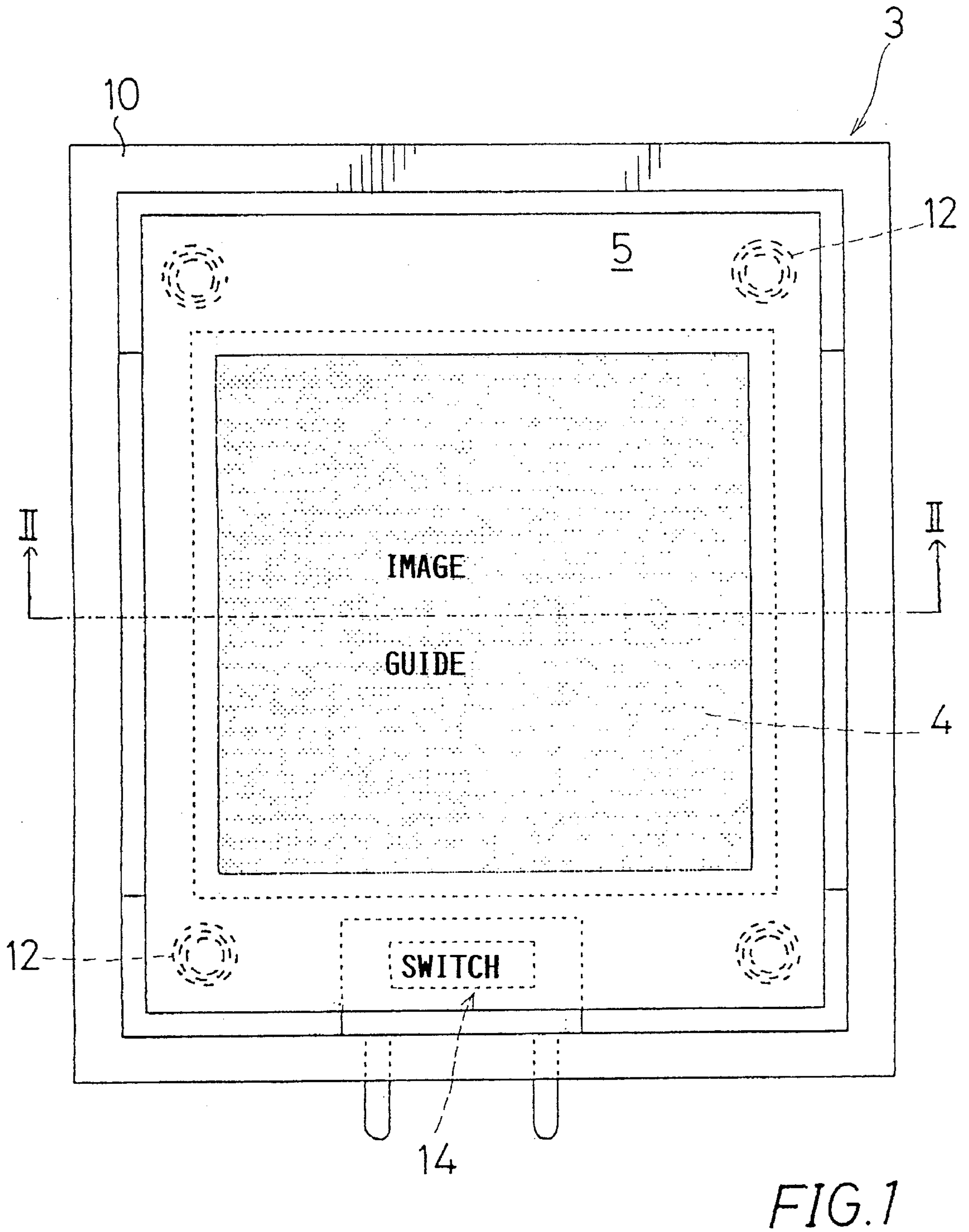
FIG. 1 is a plan view of a display push switch according to a first embodiment of the present invention.
Figure 2:
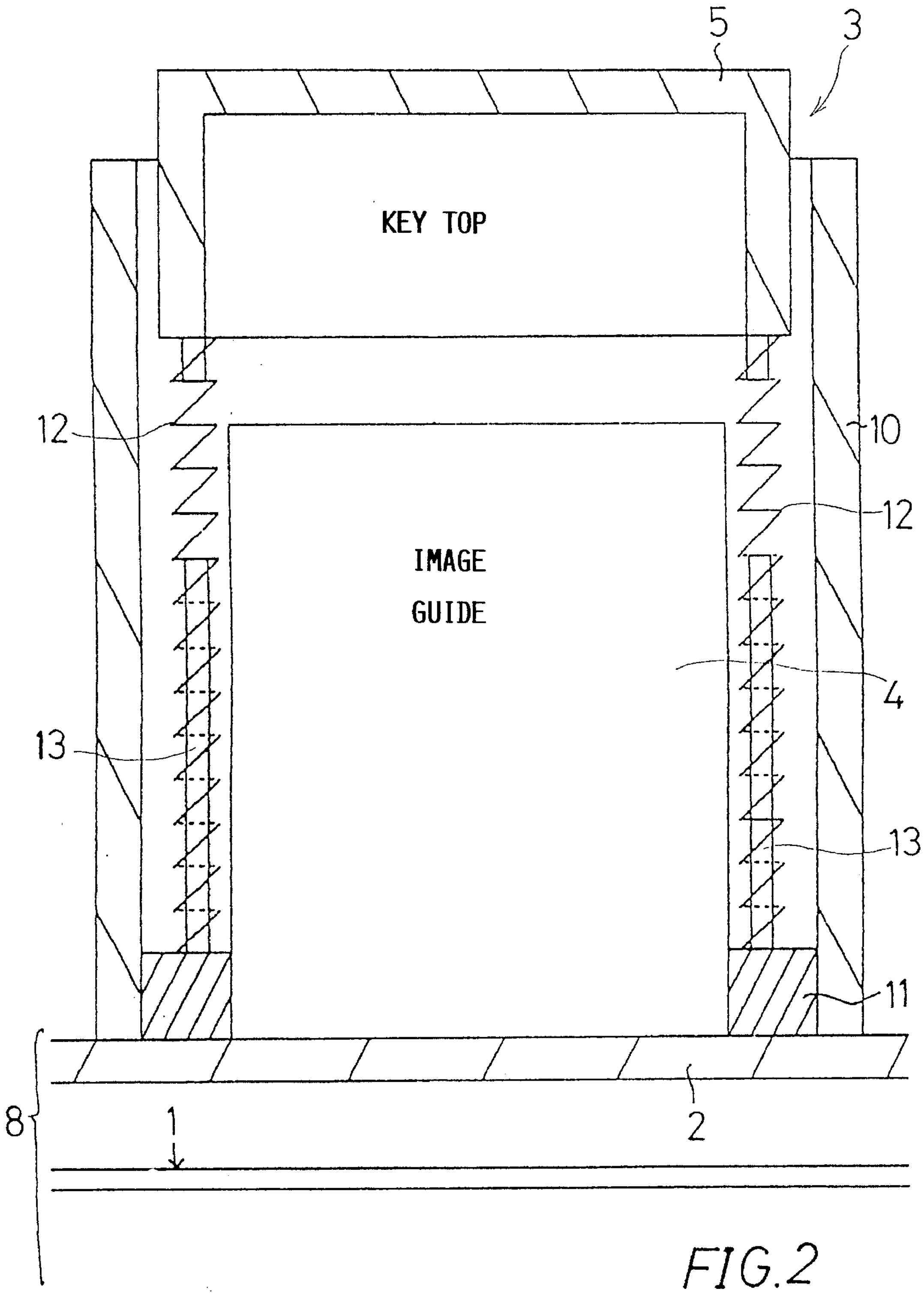
FIG. 2 is a sectional view taken along line II—II in FIG. 1.

Referring to FIGS. 1 and 2, there is shown a display push switch 3 having a housing 10. The housing 10 has an open upper end and an open lower end.

A square frame-like bottom plate 11 is disposed within the housing 10 at the open lower end thereof. A push button or key top member 5 made of transparent material is disposed at the open upper end of the housing 10 and is supported by the bottom plate 11 via coil springs 12. Vertical support pins 13 are fixedly mounted on the bottom plate 11 and are inserted into the coil springs 12 so as to keep the vertical position of the coil springs 12.

An image guide 4 is disposed within the housing 10 and is fixedly received within the bottom plate 11. The image guide 4 has a lower flat end positioned at the lower open end of the housing 10. The image guide 4 has an upper flat end spaced from the key top member 5 by a predetermined distance. The upper flat end and the lower flat end are parallel with each other. The image guide 4 is composed of a plurality of optical fibers each having a longitudinal axis in a vertical direction and arranged in juxtaposed relationship with each other. Here, each of the optical fibers is circular in section and has a two-step refractive index distribution such that the refractive index is higher at a core portion than at a peripheral portion.

The display push switch 3 thus constructed is disposed on a display device 8 such as a CRT, an LCD, an ELD, a PDP and a VFD. The display device 8 has a face glass 2 disposed above an image plane i which may be a flat surface or a curved surface. For example, the image plane 1 is a curved surface if the display device 8 is a CRT. The lower open end of the housing 10 as well as the image guide 4 of the display push switch 3 is positioned in contact relationship with the face glass 2 or may be positioned away from the face glass 2 by a predetermined distance.

With this construction, the image displayed on the display device 8 is transmitted from the lower flat end of the image guide 4 to the upper flat end thereof by means of the optical fibers, so that, through the key top member 5, the operator can observe the image transmitted to the upper flat end of the image guide 4.

Additionally, as shown in FIG. 1, a switching device 14 is mounted on the housing 10. The switching device 14 is operable to be turned on and off in response to shifting of the key top member 5. Such a switching device may be constructed by a microswitch, a lead switch or the like and is well known in the art.

Although not shown in the drawings, a plural number of the display push switches 3 each having the housing 10 and the key top member 5 can be provided. In such a case, the display device 8 displays different images corresponding to the key top members 5.

With the first embodiment, the following effects can therefore be obtained. No space is required about the image plane i for placing the key top member 5, and thus, the display push switch 3 may be small in size. In addition, the operator can observe the image of the display device 8 through the key top member 5, so that the operator can readily recognize the image corresponding to the key top member 5. Further, the key top member 5 can be shifted by the pushing operation of the operator, so that click feeling or stroke feeling can be obtained. Furthermore, one display device 8 can be used with a plural number of the display push switches 3 each having the housing 10 and the key top members 5, so that the manufacturing costs can be reduced.

Figure 3:
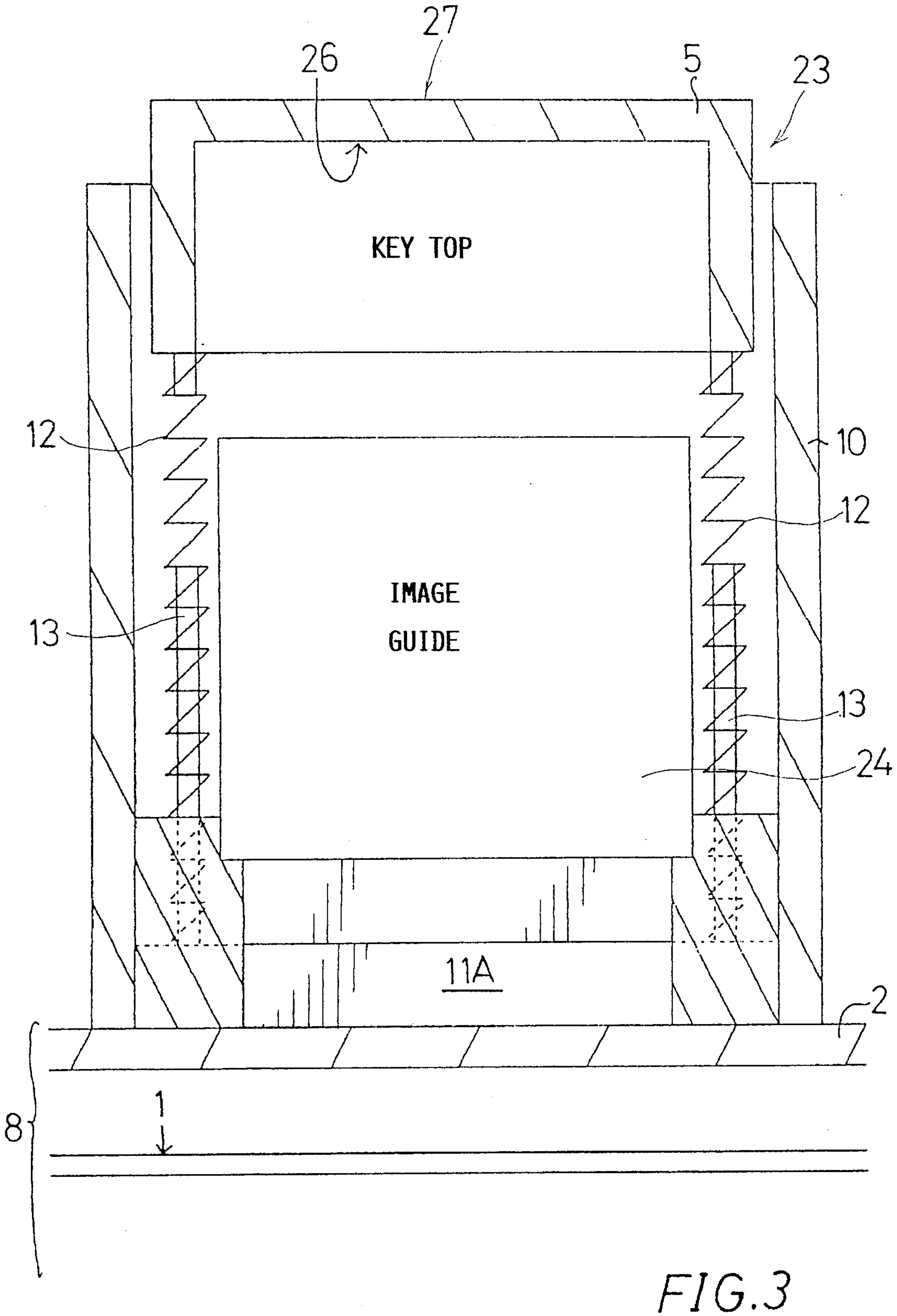
FIG. 3 is a sectional view similar to FIG. 2 but showing a second embodiment of the present invention.

A second embodiment of the present invention will now be explained with reference to FIG. 3. The second embodiment is a modification of the first embodiment. Parts that are the same as those in the first embodiment are given like reference numerals and their description will not be repeated.

A display push switch 23 of the second embodiment includes a self-focusing lens 24 disposed within the housing 10. The self-focusing lens 24 has a lower flat end supported by a square frame-like bottom plate 11A at its peripheral portion. The bottom plate 11A is disposed at the lower open end of the housing 10.

The self-focusing lens 24 has an upper flat end spaced from the key top member 5 by a predetermined distance. The lower flat end is positioned above the lower open end of the housing 10. The upper flat end and the lower flat end are parallel with each other.

The self-focusing lens 24 is composed of a plurality of lens elements each having a longitudinal axis in a vertical direction and arranged in juxtaposed relationship with each other. The lens elements themselves are optical fibers but are different from the optical fibers forming the image guide 4 of the first embodiment in their optical characteristic as will be hereinafter explained.

Each of the lens elements is circular in section and has a refractive index distribution such that it is symmetrical with respect to the central axis in section. More specifically, the refractive index distribution has a parabolic distribution in which the refractive index increases toward the central axis of the lens element. With such a refractive index distribution, when an incident light from an image enters one end of the lens element, the light moves in a zigzag fashion within the lens elements and then outgoes from the other end. Practically, by determining the length of the lens element as ¾ times the period of the zigzag movement, an equimultiple erecting real image can be formed by the outgoing light.

Thus, the lens element serves to form an image by itself and in a similar way as a convex lens having a shorter focal distance. The lens element however provides an erecting real image and is different from the convex lens which provides an inverted real image.

The vertical length of the self-focusing lens 24 and the position of the key top member 5 is determined such that an image displayed on the image plane 1 of the display device 8 is mapped on an inner surface 26 or on an outer surface 27 of the key top member 5 as an erecting real image by the self-focusing lens 24 as described above. Here, the inner surface 26 or the outer surface 27 of the key top member 5 on which the erecting real image is formed is ground to provide a mat surface (ground surface).

With this construction, the view field (mapping area) of the image displayed on the image plane 1 of the display device 8 becomes broader as the number of the lens elements of the self-focusing lens 4 increases. Therefore, the field of view of the image can be selectively determined in response to the number of the lens elements in lengthwise and widthwise directions of the self focusing lens 24.

Thus, the view field of the image can be broadened without varying the length of the lens elements or without varying the focal distance, so that the self-focusing lens 24 may be small in size and that the display push switch 23 may be small in size.

With the second embodiment, the following effects can be obtained in addition to the effects as described in the first embodiment.

With the self-focusing lens 24 being spaced from the image plane 1 of the display device 8, an image displayed on the image plane 1 can be formed on the inner surface 26 or the outer surface 27 of the key top member 5 as an erecting real image which is not out of focus and has a broader angle of view field, so that the display push switch 23 can be adapted to various kinds of display devices.

While the invention has been described with reference to preferred embodiments thereof, it is to be understood that modifications or variation may be easily made without departing from the spirit of this invention which is defined by the appended claims.

What is claimed is:

1. A display push switch adapted for mounting on a surface structure of a display device, comprising:

a switch housing having an open upper end and an open lower end;

a key top member made of substantially transparent material and disposed within said open upper end of said switch housing, said key top member being operable by an operator to be pushed into said switch housing; and image transmission means fixedly disposed within said switch housing and having a lower end surface and an upper end surface, said lower end surface fixedly confronting the surface structure of the display device through said open lower end of said switch housing, and said upper end surface confronting said key top member and being spaced from said switch housing and said key top member to permit a stroke movement of said key top member when said key top member is pushed by the operator;

said image transmission means including a plurality of image transmission elements each having a longitudinal axis extending between said upper and lower end surfaces in a vertical direction and operable to transmit an image from said display device to said key top member, said elements being arranged in juxtaposed relationship with each other.

2. The display push switch as defined in claim 1 wherein said image transmission elements are made of optical fibers.

3. The display push switch as defined in claim 1 wherein said image transmission elements are lens elements each operable to form an image by itself.

4. The display push switch as defined in claim 1 wherein said upper end surface and said lower end surface of said image transmission means are formed as flat surfaces extending in parallel with each other.

5. The display push switch as defined in claim 3 wherein each of said lens elements has a substantially circular section and has a refractive index distribution in section such that the refractive index increases toward the center of the circular section.

6. The display push switch as defined in claim 3 wherein said key top member has an outer surface and an inner surface, said outer surface being exposed to the outside, said inner surface confronting said upper surface of said lens means, and one of said outer and inner surfaces being formed as a mat surface, so that the image displayed on the display device and transmitted by said image transmission means is formed on said mat surface as an erecting real image.

7. A display push switch device adapted for mounting on a surface structure of a display device, comprising a plurality of display push switches each positioned above the surface structure of the display device and having open bottom, each of said display push switches including:

a key top member operable by an operator to be pushed and having a mat surface formed thereon; and an image transmission means disposed below said key top member and fixed in position;

said image transmission means having an upper surface confronting said key top member and having a lower surface confronting the surface structure of the display device;

said image transmission means including a plurality of self-focusing lens elements positioned in juxtaposed relationship with each other, so that a corresponding part of a picture of character displayed on the display device is formed on said mat surface as an equimultiple real image for visual recognition by an operator.

8. The display push switch device as defined in claim 7, wherein said lens elements have the same length and flat upper and lower ends so that said upper and lower surfaces of said image transmission means are flat, and wherein said mat surface of said key top member and said upper and lower surfaces of said image transmission means are positioned in parallel to said surface structure of the display device.

* * * * *

UNITED STATES PATENT AND TRADEMARK OFFICE

CERTIFICATE OF CORRECTION

PATENT NO. : 5,578,816

DATED : November 26, 1996

INVENTOR(S) : Hirokazu Fukatsu

It is certified that error appears in the above-indentified patent and that said Letters Patent is hereby corrected as shown below:

Column 3, lines 12 and 37, "i" should be -- 1 --.

Claim 7, column 6, line 12, insert after "including" -- a switch housing having an open upper end and an open lower end; --.

Claim 7, column 6, line 13, insert after "a key top member" the following -- centrally disposed within the upper end of said housing; --.

Claim 7, column 6, line 16, after "and" insert -- within the housing and --.

Signed and Sealed this

Fifteenth Day of April, 1997

Attest:

Bruce Lehman

BRUCE LEHMAN

*Attesting Officer* *Commissioner of Patents and Trademarks*